Figure 3:
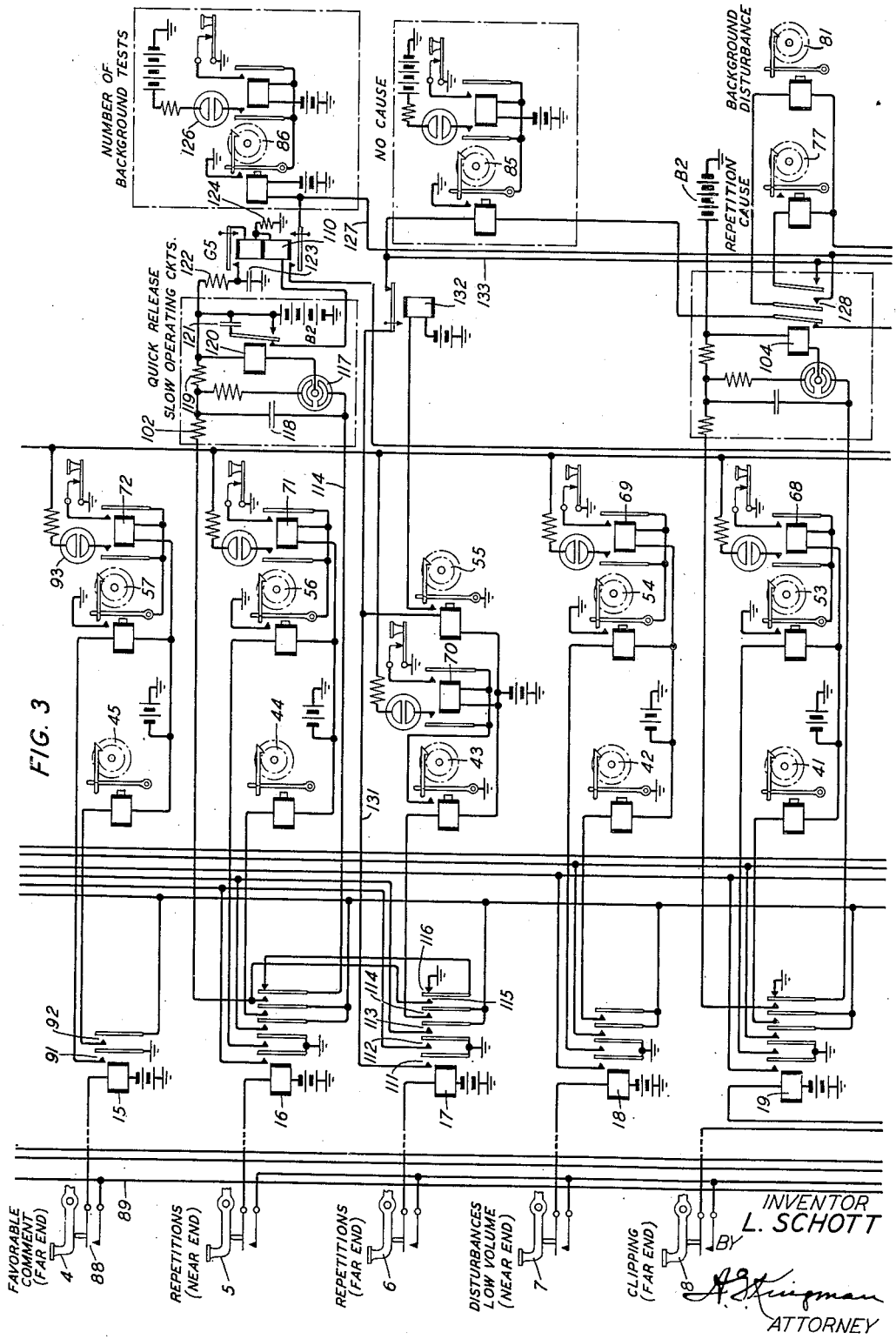

April 8, 1941.                L. SCHOTT                2,237,767
                         REGISTERING SYSTEM
                       Filed April 13, 1938            3 Sheets-Sheet 1
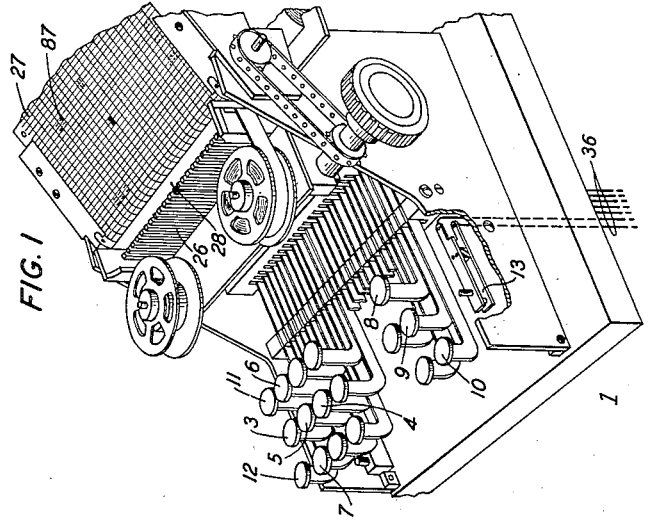
FIG. 1
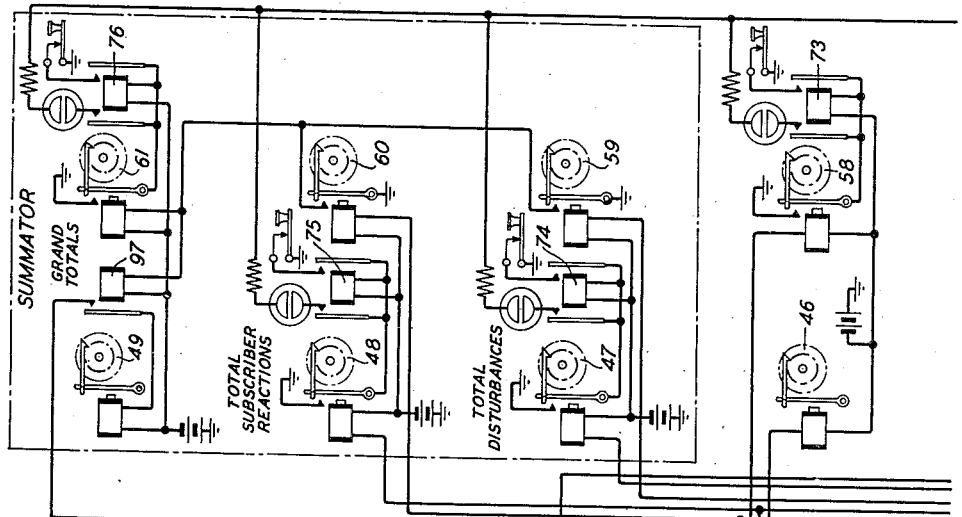
FIG. 2
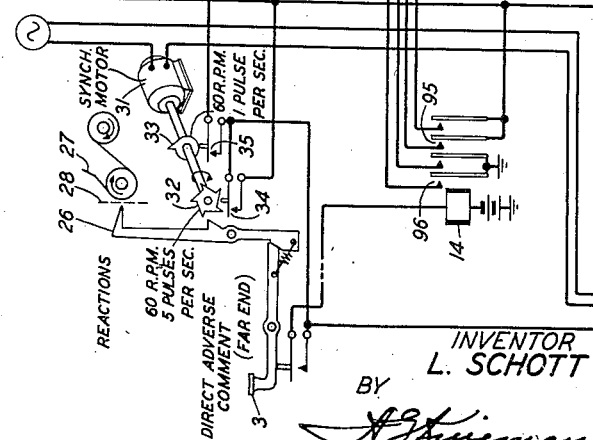
INVENTOR
L. SCHOTT
BY
*H.J. Kruizinga*
ATTORNEY April 8, 1941.　　　　　L. SCHOTT　　　　　2,237,767

REGISTERING SYSTEM

Filed April 13, 1938　　　3 Sheets-Sheet 2

INVENTOR
L. SCHOTT
BY
ATTORNEY

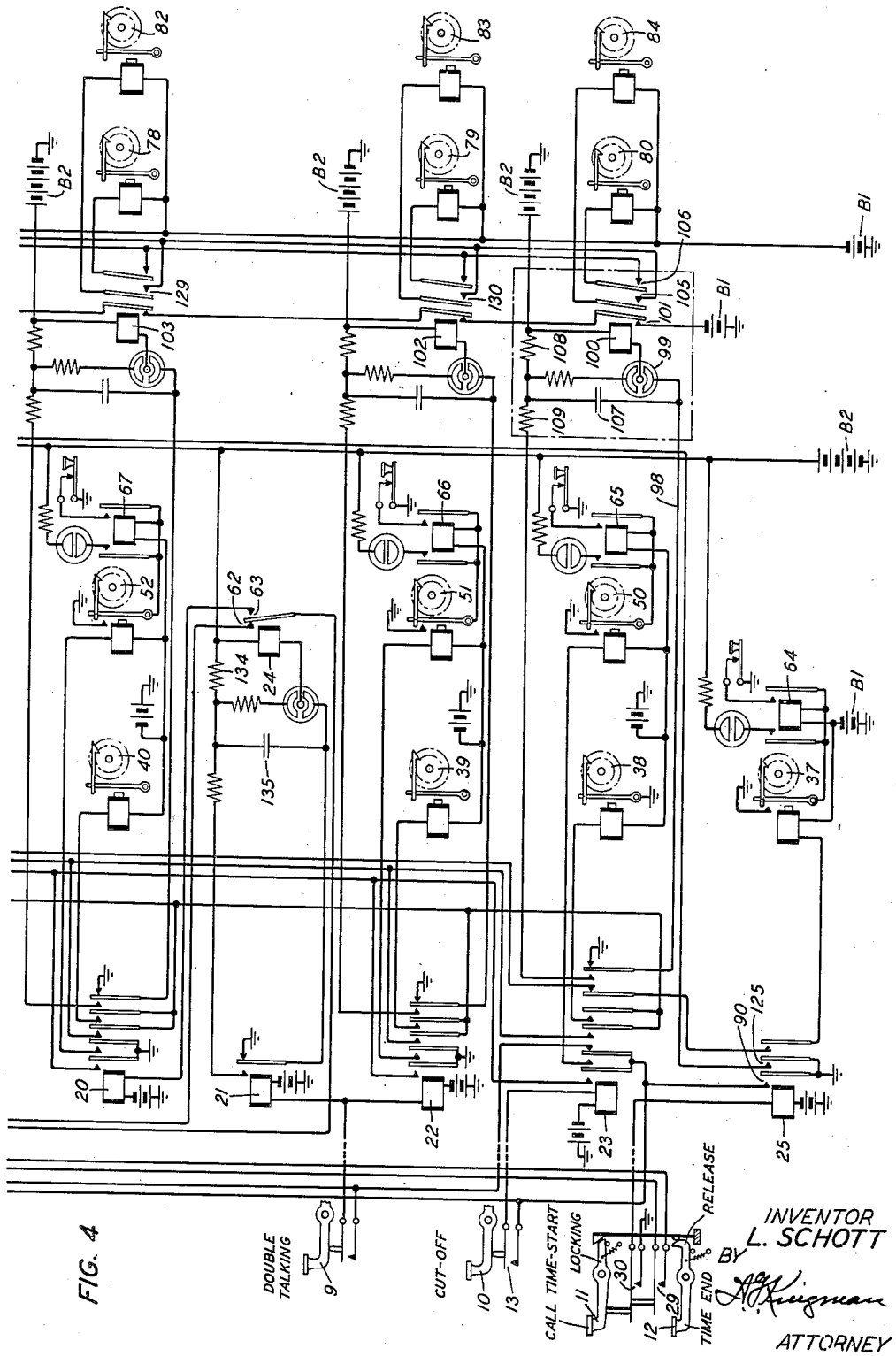

Patented Apr. 8, 1941

2,237,767

UNITED STATES PATENT OFFICE 2,237,767

REGISTERING SYSTEM

Lionel Schott, East Orange, N. J., assignor to Bell Telephone Laboratories, Incorporated, New York, N. Y., a corporation of New York Application April 13, 1938, Serial No. 201,717

4 Claims. (Cl. 235—92)

This invention relates to recording and registering observed subscriber reactions to the service rendered by a telephone connection and the occurrence of disturbing effects on the line and more particularly to means whereby an observer listening in on a connection can instantly make a record on a moving chart of any separate or simultaneous occurrences of certain predetermined observed reactions by either party to a conversation, or observed disturbances which might, but not necessarily, cause a subscriber reaction and simultaneously therewith register the total number of occurrences of each disturbance and reaction recorded, the total number of times any disturbances and reactions were recorded, the total elapsed time each type of disturbance and reaction was observed, the total elapsed time any disturbances and reactions were observed, the total number of reactions preceded within a predetermined interval by a disturbance, called "foreground disturbance," the total number of predetermined sample intervals following the ends of reaction periods, the number of these sample intervals during which disturbance occurrences were observed, called "background disturbance," and the number of reactions observed which were not immediately preceded within a predetermined interval by a disturbance which is a measure of the reactions observed for which no disturbance was observed that could be considered responsible.

The present standard method or technique of observing service on toll connections is for an observer to listen in and note on a specially prepared chart, among other data, the number of times either of the subscribers repeats, the presence of noise on the line of sufficient magnitude, in the judgment of the observer, to be objectionable or interfere with satisfactory conversation, cross-talk and cross-ringing from other circuits, breaks in the connection, etc. These records, however, merely show that a disturbance was noticed and also the number of times a reaction occurred, but do not take into account their duration due to the difficulty of accurately making such a time record.

The invention herein described provides facilities whereby an observer can easily record and register both the number and duration of requested repetitions, adverse or favorable comments by the subscribers, simultaneous talking by both subscribers (double talking), low speech volume from either end of the connection, speech distortion, breaks in the connection, and as many other occurrences as may be desired. From these records considerably more and quicker information about transmission conditions on the lines involved can be obtained with less effort on the part of the observer than is possible with the standard method.

The principal object of the invention is to provide a suitable manually controlled mechanism whereby the foregoing records and registrations can be easily and quickly made by an observer.

Another object of the invention is to so use certain parts of the recorded data as to obtain results indicating the degree with which the disturbances act as probable causes of subscriber reactions, the effects of the observer's judgment and of usual tolerance on the part of subscribers having been eliminated from the results.

A feature of the invention resides in a mechanism consisting of two parts, one a keyboard recorder which makes a paper record showing the time and duration of occurrence of notable events observed during a conversation between two subscribers and an automatic analyzing register mechanism, electrically controlled by the recorder keyboard, which counts and times all events recorded and also correlates certain causes or disturbances with contemporaneous reactions by subscribers.

More specifically, the recorder consists of a keyboard provided with a key for each disturbance and reaction, which it is desired to record, so arranged that when a particular key is depressed a tapping bar is released which under spring action, flies forward and marks a moving paper chart which is fed through the recorder under control of a driving mechanism. To permit free movement of the paper the tapping bar is intermittently operated at a rate of the order of one-fifth of a second as long as the key is depressed. Due to the rate of movement of the paper chart as compared with the tapping rate, a substantially continuous mark is recorded on the chart during the interval the key is depressed. The markings caused by the individual keys are recorded in parallel vertical columns.

Associated with each key are electrical contacts included in an electrical circuit extending into the analyzing register for controlling a so-called master relay individual to each key. The analyzer also includes a plurality of counting registers which are so connected and arranged as to be controlled by the master relays to register the foregoing described occurrences recorded by the observer.

A further and more specific feature of the invention resides in the use of gas tube delay circuits associated with the master relays whereby the foregoing described correlation of a disturbance with a reaction is effected.

The invention will be understood from the following description and accompanying drawings:

Fig. 1 of which is a schematic perspective of the keyboard tape recorder portion of my invention; and Figs. 2, 3 and 4 when joined, with Fig. 2 above Fig. 3, and Fig. 4 below Fig. 3, show the circuit arrangement of the analyzer register mechanism including the electrical control thereof effected by the keyboard mechanism. Similar reference characters appearing in the different figures indicate the same elements.

Referring to Fig. 1, 1 is the keyboard tape recorder, 3, 4, 5, 6, 7, 8, 9, 10, 11 and 12 are keys for individually actuating the type bars 26 for marking the tape 27. 28 is a conventional typewriter ribbon arrangement moved at a slow rate between the type bars and the paper tape and 13 are contacts, one set per key (except 11 and 12) operated thereby, adapted to control respective master relays such as 14, 15, 16, 17, 18, 19, 20, 21, 22 and 23 in the analyzer mechanism of Figs. 2, 3 and 4. Keys 3, 4, 5 and 6 are for recording subscriber reactions to the quality of the transmission furnished by the facilities including the circuit employed in establishing the talking connection, and keys 7, 8, 9 and 10 are for recording observed disturbances which may, or may not, have an effect on the conversation and cause a subscriber reaction which may be recorded by the keys 3, 4, 5 and 6. Key 11 is a locking start ("call time") key having two sets of contacts 29 and 30 (Fig. 4) which are closed when the key is operated at the beginning of the conversation. Closure of the contacts 29 closes an obvious circuit for the motor 31 (Fig. 2) which advances the paper tape 27, and operates cams 32 and 33 which periodically close contacts 34 and 35, respectively, for a purpose to be later described. 12 is a "time end" key which when operated at the close of the conversation mechanically unlocks key 11 and permits it to release.

The general method of operating is as follows: The observer usually sits at a switchboard position in which a toll line to be observed terminates in a listening jack in the face thereof. The keyboard 1 may be placed in some convenient place on the keyshelf of the switchboard and the analyzer, which is contained in a cabinet mounted on wheels, similar to a tea wagon, is conveniently located nearby and connected by means of a flexible cable 36 with the keyboard mechanism 1.

The observer is provided with a head receiver (not shown) which can be connected to the listening jack of the line to be observed by means of a cord and plug.

When a call is to be observed the observer connects her head receiver plug with the jack and listens to the building-up of the connection and when the called subscriber answers the conversation commences she operates key 11 which sets her keyboard mechanism in motion and through contacts 30 operates relay 25 in the analyzer which starts timing the duration of the conversation and otherwise prepares the analyzer circuit for operation in response to actuation of keys 3, 4, 5, 6, 7, etc.

As the observer hears certain predetermined phenomena, either a subscriber reaction or a disturbance, bearing on the circuit performance or transmission, she will operate the particular keyboard key, so designated, holding it depressed as long as the reaction or disturbance continues, no attempt being made, however, in general to assign a cause or give any explanation for the observed effect.

If the observer hears a subscriber comment, either favorable or unfavorable, as to the quality of the transmission, as for example, "I hear you very well," "I don't hear you," or hears either subscriber repeat at the other's request, she immediately depresses the properly designated key, and holds it in the depressed position as long as the reaction persists. Further, upon recognizing a disturbance on the line, as for example, low volume, clipping, a cut-off, noise, cross-talk, etc., she also depresses the properly designated key and holds it depressed as long as the disturbance continues.

When the subscribers are finished talking the observer operates the "time end" key 12 which releases start key 11, which stops the motor 31 and disables all the key circuits to prevent further operation of the analyzer.

37 (Fig. 4) is a cumulative time register which operates once each second, under control of the cam 33 and contacts 35 associated with the motor 31, when its circuit is closed by the operation of the start key 11. 38 to 49, inclusive, Figs. 4, 3 and 2) are also cumulative time registers which operate five times each second, under control of the cam 32 and contacts 34, when their respective circuits are closed, as will hereinafter appear. 50 to 61, inclusive, are cumulative registers which operate once each time their respective circuits are operated. It will be noted, as hereinafter explained, that closure of key 8 may cause operation of either master relay 19 or 20 and their respective associated registers and circuits, dependent upon the position of contacts 62 and 63 of relay 24.

Registers 38, 39, 40, 41 and 42 are operated five times per second under control of cam 32 and interrupter contact 34 as long as their respective disturbance keys 10, 9, 8 or 7 are operated, registers 43, 44, 45 and 46 also operate in the same manner as long as their respective reaction keys 6, 5, 4 or 3 are operated, register 47 operates at this same rate as long as any one or more of the disturbance keys 10, 9, 8, 7 are operated, register 48 operates at this five per second rate as long as any one or more of the reaction keys 6, 5, or 3 are operated, (excluding key 4), and register 49 also operates at this same time as long as either register 47 or register 48, or both, is operated, it being noted that operation of key 4 does not cause register 48 to operate.

Registers 50, 51, 52, 53 and 54 operate once each time their respective disturbance key circuits 10, 9, 8 or 7 are operated, registers 55, 56, 57 and 58 operate once each time their respective reaction keys 6, 5, 4 and 3 are operated, register 59 operates once for each period whenever any one or more of the disturbance keys 10, 9, 8 or 7 are operated, register 60 operates once for each period whenever any one or more of the reaction keys 6, 5 or 3 are operated (excluding key 4), and register 61 also operates once for each period that either register 59 or register 60, or both, is operated, it being noted that operation of key 4 does not cause register 60 to operate.

It will thus be noted that register 37 registers the time in seconds that key 11 is operated, i. e.

the duration of the conversation, registers 38 to 46, inclusive, individually register the total time in fifths of a second that the respective keyboard keys 10, 9, 8, 7, 6, 5, 4, 3, have been held operated. Register 47 registers the total recorded disturbance time, register 48 registers the total subscriber reaction time minus the favorable comment time, and register 49 registers the total time that any of the recording keys, except 4, have been operated. Thus, for example, assuming the case of the near end subscriber talking, and "low volume" is noted for which key 7 is operated for ten seconds, during which period a slight "double talk" of one second duration occurred after five seconds had elapsed for which key 9 was operated and a "near end repetition" of two seconds occurred after seven seconds following the operation of key 7, the count on the timing registers would advance register 42 fifty units, 39 five units, 44 ten units, 47 fifty units, 48 ten units, and 49 fifty units.

Further, registers 50, 51, 52, 53 and 54 each register the number of times their respective disturbance keys have been operated, registers 55, 56, 57 and 58, the number of times their respective reaction keys have been operated, register 59 indicates the number of continuous periods when any one or more of the disturbance keys were operated, 60 indicates the number of continuous periods when any one or more of the reaction keys were operated (except key 4) and register 61 counts the number of continuous periods when either the disturbance keys or the reaction keys, or both, were operated. Thus, assuming the example of the preceding paragraph, the counts in the affected registers 54, 51, 56, 59, 60 and 61 would have advanced one unit in each register due to the occurrences of notable events in the assumed ten second period.

As noted elsewhere in the foregoing, the number and the duration of "favorable comments" (key 4) are registered only in registers 57 and 45, no special note being taken of them in the "summator" (Fig. 2) registers.

Associated with certain of the disturbance circuits, for example, clipping (far end), double-talk clips, double talking, and cut-offs (keys 8, 9 and 10), are what are known as repetition cause registers 77, 78, 79 and 80 which operate individually each time the observer records, by means of key 6, a repetition by the distant subscriber provided their respective disturbance keys 8, 9, or 10 were in an operated condition not more than ten seconds prior to operation of the repetition key 6.

Register 85, called the "no cause" register will be operated when the repetition key 6 is operated provided none of the disturbance keys (8, 9, or 10) has been in an operated condition, and was released, less than ten seconds, before the repetition key 6 is operated.

Associated with the repetition cause registers (77, 78, 79 and 80) are corresponding registers 81, 82, 83 and 84 known as disturbance background registers which record the presence of the particular disturbance when the respective key is operated in the interval between five and fifteen seconds after either repetition key 5 or 6 has been released, following its operation, provided the observation is still in progress with key 11 operated.

Register 86 operates fifteen seconds after key 5 or 6 has been released, following its operation, and counts the number of times what is called a background test has been made.

A description of the operation of the circuits of the invention, particularly in regard to the specific feature whereby correlated disturbance and reactions are registered, will now be given.

Let it be assumed that the keyboard recorder and analyzer are connected by means of cable 36, that the observer is seated before the recorder, has operated keyboard key 11 to start the motor 31 and condition the analyzer for registration, and is listening to a conversation being carried on over a line between two subscribers.

Let it further be assumed that the first item which attracts the observer's attention, as being worthy of record, is a request by the subscriber at the end of the line nearest the observer, called the "near end," as to whether the distant subscriber (far end) hears the first subscriber, to which the distant subscriber replies "Yes, perfectly," whereupon the observer depresses keyboard key 4 designating a favorable comment (far end). Operating key 4 causes the associated tapping bar, similar to 26 (Fig. 1) of key 3, to mark the tape 27 as indicated at 87 (Fig. 1). Operating key 4 also closes its contacts 88 thereby completing a circuit to operate its respective master relay 15 in the analyzer mechanism (Fig. 3). This circuit can be traced from battery, winding of relay 15, contacts 88 of key 4, conductor 89 in cable 36 and contacts 90 of relay 25 to ground, relay 25 having been operated when key 11 was operated at the beginning of the conversation.

Relay 15 in operating closes its contacts 91 and 92 thereby actuating item register 57 and causing it to increase its reading by one unit, and connects at contacts 92, ground, interrupted five times each second, to successively operate register 45 thereby increasing its reading at this rate as long as key 4 and relay 15 remain operated. Operation of the register 57 closes its contacts to operate relay 72 which locks at its right-hand contacts and at its left contacts closes a circuit from battery B2 to light the gas glow lamp 93 which continues to glow until key 94 is operated at the conclusion of the observation.

It will be noted that the readings of the registers 45 and 57 are not added in the readings of the summator registers 48 and 60, or 49 and 61, as this particular reaction is favorable to the service and need not be included in the total of the unfavorable items.

If the distant subscriber's reply to the question "Do you hear me all right?" was unfavorable, for example, "Not very well," the observer would have operated key 3 thereby operating relay 14 which operates register 58 to count the reaction, register 46 to time the duration of the distant subscriber's reply, and by closing its contacts 95 and 96 to operate the summator registers 48 and 60, respectively. Closure of contacts 96 operates register 60, in an obvious circuit, to advance its reading one unit and closure of contacts 95 connects ground, interrupted five times per second, by contacts 34, to register 48 to cause it to advance in step with register 46. Operation of register 60 closes an obvious circuit to operate register 61 which also advances its reading one unit. Relay 97 operates in parallel with register 61 and closes its contacts to connect the time register 49 to ground interrupted five times per second by contacts 34, which circuit remains closed as long as key 3 is closed.

Let us now assume that a "cut-off" occurs somewhere between the two subscribers thereby interrupting their conversation which may have been occasioned by an operator accidentally withdrawing a plug, by an accidental opening of the circuit by a testboard attendant, or by any one of a number of other causes, whereupon the observer operates key 10 thereby marking the keyboard tape 27 and operating master relay 23. Relay 23 operates the individual item and time registers 50 and 38 and summator item and time registers 59 and 47 in a circuit which is similar to the circuit for registers 60 and 48 previously described. Register 59 operates the grand total item register 61 and relay 97 in parallel therewith, which latter relay in turn connects the grand total time register 49 to interrupted ground as hereinbefore described.

It will be noted that prior to its operation relay 23, at its extreme right-hand back contact connects ground to conductor 98 leading to the cathode of a gas-filled discharge tube 99 which tube is therefore normally conducting, the circuit for the discharge extending from battery B2, winding of relay 100, anode and cathode of tube 99 to ground on conductor 98 at the outer right back contacts of relay 23. Relay 100, therefore, is normally energized and its contacts 101 are closed thereby connecting battery B1 over similar contacts of relays 102, 103 and 104 to the "no cause" register 85, contacts 105 and 106 of relay 100 being open under normal conditions. Under this condition condenser 107 is charged to the potential of the battery B2 in series with high resistance 108 (of the order of 5 megohms). When key 10 is operated, relay 23 operates, as before stated, which opens the right-hand back contact of the fifth armature from the left, thereby opening the circuit for the conversation time register 37, which was originally closed by the operation of the start key 11 and relay 25. The reason for this is that it is not desired to count the time the circuit is not in condition for conversation. Further, at the back contacts of the second armature from the left, relay 23 in operating disables, by opening the ground circuit extending from contacts 90 of relay 25, to all other disturbance and reaction key circuits, excepting "direct adverse comment" key 3, since operation of those circuits would have no notable significance as long as the "cut-off" persisted. No other disturbance key circuits have these two disabling features.

Relay 23 in operating also removes at its extreme outer right back contacts, ground from conductor 98 thereby opening the discharge circuit for tube 99 and permitting relay 100 to release immediately. Operation of relay 23 also closes the front contacts of its extreme right-hand armature, thereby short-circuiting condenser 107 through the 1000 ohm resistance 109, and condenser 107 therefore discharges. Relay 100 in releasing opens its contacts 101, thereby removing battery from the "no cause" register 85, and closes its contacts 105 and 106 which, however, have no effect at this time.

When key 10 is released, ground is again connected to conductor 98 by the release of relay 23 whereupon a circuit is completed to ionize the gas tube 99 by impressing the potential of battery B2 across the two semi-circular electrodes (cathode and control electrode). The full potential of battery B2 is not applied to the tube immediately as the cathode and the control electrode are shunted by the now discharged condenser 107 which immediately starts to charge from battery B2 to ground at the now closed contacts of relay 23 and therefore the tube does not break down until the condenser has charged sufficiently to raise the potential across its terminals to the voltage which is sufficient to break down the control gap of the tube and cause it to fire, whereupon the main gap (cathode to anode) fires, in the usual manner, and current flows through relay 100 which causes it to operate. In practice the values of condenser 107 and resistance 108 are so chosen that the condenser will charge sufficiently to cause the tube to break down ten seconds after key 10 is released.

It will be noted that, as long as master relay 17 is not operated, there is no circuit to operate the "no cause" register 85 when relay 100 is operated, or to operate register 80 when relay 100 is released, and as long as relay 110 is released there is no circuit to operate register 84 when relay 100 is released; the period, during which relay 100 is released and its contacts 105 and 106 closed, being from the moment key 10 is operated until ten seconds after it is released.

Now let us assume that the observer has noted a "cut-off" and depresses key 10 for the period that the line is dead which, as before described, causes relay 23 to operate, stops the stepping of register 37, disables all other disturbance and reaction master relays (except that for key 3 circuit), and causes relay 100 to release which closes its contacts 105 and 106 thereby partially closing a circuit to operate registers 80 and 84. As before stated, the foregoing conditions are established immediately upon operation of key 10. Relay 100 remains released for ten seconds after relay 23 releases. Let it further be assumed that at any time during the interval that relay 100 is released, that the near end subscriber asks the distant subscriber to repeat, which is an obvious request under the circumstances, whereupon, when the distant subscriber replies, the observer depresses key 6 to record the repetition. Operation of key 6 operates relay 17 which closes its contacts 111 to 115, inclusive, and opens its contact 116. Closure of contacts 112 and 113 causes operation of registers 60 and 48 as previously explained. Contact 114 causes register 43 to operate and the opening of contacts 116 and closure of contacts 115 interrupt the normal discharge path of gas tube 117 and closes a short circuit around condenser 118 to cause its discharge in the same manner as described for gas tube 99 and condenser 107, the principal difference between this circuit and that for tube 99 and condenser 107, being that resistance 119 is considerably higher than resistance 108, i. e., of the order of 7½ megohms instead of 5 megohms, which slows down the recharging of condenser 118 for about fifteen seconds instead of ten seconds as in the case of condenser 107 and consequently delays the reoperation of relay 120 by this same amount, when relay 17 releases. When relay 120 releases, condenser 121, which has been charged to the potential of battery B2 through the lower winding of slow-operate relay 110, is short-circuited and immediately discharges. When key 6 is released the short circuit is removed from condenser 118 and when it has become charged (in approximately fifteen seconds) tube 117 breaks down and re-energizes relay 120 which closes its front contacts and condenser 121 starts to recharge from battery B2 through the lower winding of relay 110, which relay operates due to the surge of current flowing into the condenser. When relay 110 operates it closes its upper contacts thereby closing a shunt circuit through its upper winding for normally charged condenser 123, whereupon the condenser discharges in this path which tends to hold the relay operated for a slightly longer period. The relay 110, however, soon releases when condenser 121 becomes charged and condenser 123 becomes discharged. The capacity of condenser 123 and the resistance 124 are so chosen that, in combination with the resistance of the upper winding of relay 110, the flux of the relay is maintained for about five-tenths of a second after it operates. Condenser 123 is normally charged from battery B2 through resistance 122 which is large and passes so little current as to have practically no effect during the operated period of relay 110. This momentary operation of relay 110 completes a circuit from ground, at contact 125 of relay 25, to operate the "background test" register 86 and to cause the neon glow lamp 126 to be lighted as previously described. The closure of the lower contacts of relay 110, which closes the circuit for register 86, also connects ground to conductor 127 which is multipled to contacts 128 of relay 104, contacts 129 of relay 103, 130 of relay 102 and 105 of relay 100, but as we have previously assumed that key 6 was operated during the ten-second interval following the release of relay 100, relay 110 does not operate until after relay 100 reoperates and hence ground on conductor 127 is not effective to operate register 84.

Returning now to the operation of key 6, and master relay 17, this relay in operating also closes its contacts 111 which connects ground to conductor 131 which is momentarily effective to operate register 80 in a circuit which can be traced over the back contacts of relay 132, conductor 133 and the closed contacts 106 of relay 100 through the register 80 to battery B1. Register 80, therefore, provides a record of the number of times the distant subscriber repeated, at the request of the near end subscriber, within ten seconds after the observer has released the cut-off key 10, which indicates the end of the "line dead" period. Relay 132 which is energized in response to the operation of register 55 is slow to operate and therefore maintains its back contact closed long enough to energize register 80. When relay 132 finally operates it opens its back contacts and remains operated until key 6 is released.

Register 80 shows the number of times that a cut-off was the possible cause of that number of repetitions by the distant subscriber, i. e., probable effect of the cause or vice versa.

If the observer had noted what is termed "clipping", i. e., the loss or chopping off of a portion or all of the first syllable of a word, due usually to a lag in the operation of some voice-operated device in the telephone circuit, she would have operated key 8, instead of key 10, and following the release of key 8, if the near end subscriber requested a repetition, and the distant subscriber replied within ten seconds thereafter, register 77 instead of 80 will have been operated which will be obvious.

As hereinbefore mentioned, either master relay 19 or master relay 20 with their respective associated circuits may be operated by key 8, dependent upon the closures of contacts 62, or 63, respectively, of relay 24. In a case when "double talking" and "clipping" occur simultaneously, the first occurring and causing voice-operated devices in the telephone connection to act so as to produce the second, special note is taken of the occurrence, called "double talk clips", in the circuits of the master relay 20. Operation of key 9 causes operations of master relay 22 and relay 21. Operation of 21 causes the release of relay 24 in a manner and in a gas tube circuit similar to that described above for relays 23 and 100 of the "cut-off" circuit. Here, however, resistance 134 is so chosen that condenser 135 charges more rapidly following release of key 9 and release of relay 21, the time being of the order of two seconds. Thus the circuits of master relay 20 are enabled for operation by key 8 for an additional period of two seconds following release of key 9, these two seconds being added to insure the proper registering of "double talk clips" in case the "clipping" key 8 is still in an operated condition after the "double talk" key 9 is released, as it may normally be for an instant due to reasonable delays in the response action of the observer.

While it is obviously possible, by the addition of other counters to correlate any disturbance with any reaction, it is not deemed necessary to further complicate the drawing by such a showing. Further, it will be noted that registers 77, 78, 79 and 80 are controlled by the "far-end repetition" key 6 only, as due to the observer's location at one end of the line, and her consequent lack of information as to conditions at the distant end, it is apt to be difficult for her to determine and assign a disturbance which causes the distant subscriber to ask for, and the near-end subscriber to give a repetition. Hence, only the operation of key 6, which registers repetitions by the distant or "far-end" subscriber controls the operation of registers 77, 78, 79 and 80.

If key 6 is operated at a time when none of the relays 100, 102, 103 or 104 is released, a momentary circuit closure to cause operation of register 85 is effected, which can be traced from ground, contact 111 of relay 17, back contacts of relay 132, winding of register 85 and front contacts of relays 104, 103, 102 and 100 to battery B1. Register 85, therefore, counts each time key 6 is operated when no disturbance has been noted during the preceding ten seconds.

In addition to registering the disturbance causes which have possibly caused the distant subscriber to repeat, it is also desirable to obtain what is called a disturbance background record, i. e., a record of the presence of a particular disturbance, such as "clipping, double talk clips, double talking or cut-off", in the interval between five and fifteen seconds after either subscriber has completed a repetition, provided consecutive repetitions are spaced more than fifteen seconds apart as will be explained and also provided the conversation is still in progress fifteen seconds after the last repetition given in its course since otherwise this last "background" record which would be discarded and not registered due to its operating circuit through contacts 125 of relay 25 having been opened. This record is made on registers 81, 82, 83 and 84 in the following manner:

As previously explained, the operation of key 8, 8 and 9 together, or 9, or 10 would release the corresponding relays 104, 103, 102 or 100 which closes its back contacts thereby partially completing a circuit to operate its respective register 81, 82, 83 or 84. Also, as before discussed, the operation of either key 5 or 6, and its subsequent release, causes relay 110 to operate momentarily at the end of a fifteen-second interval following the release of the key. Now, if a disturbance (clipping, double talk clips, double talking, or cut-off) is observed and its registration is begun or completed during the interval between five and fifteen seconds after a registered repetition by either subscriber, has been completed, one of the registers 81, 82, 83 or 84 will be operated depending on which disturbance key circuit was operated. The background disturbance records, it will be noted, differ from the cause records as shown by registers 77, 78, 79 and 80, in that these registers count repetitions which follow within ten seconds of the occurrence of a disturbance, whereas the background registers 81, 82, 83 and 84 count the number of sample intervals between five and fifteen seconds after repetition periods are completed during which time the disturbance was present. The "background" sample intervals while thus chosen directly dependent on the occurrence of repetition periods, are taken as typical of the intervals during which the disturbance level is fairly steady and of such a magnitude as to generally provoke no unfavorable reaction (such as "repetition") by the subscribers. It will be noted in connection with the background registration that the relay 110 operates after the end of the fifteen-second interval following the release of key 5 or 6 and remains operated for about five-tenths of a second, after which it releases and cannot be reoperated until fifteen seconds after one of the keys 5 and 6 has again been operated and released. If a subsequent repetition registration is made which is made within the fifteen-second interval following the completion of an immediately preceding registration, the first background test is canceled and only the second will be effective to cause the registration. Similarly, the second attempt of such registration would fail in case a third repetition followed the second within fifteen seconds. This condition arises due to the fact that relay 110 which normally would have operated momentarily at the end of the fifteen-second interval following the first release of either key 5 or 6, is not energized due to the fact that condenser 118 is again discharged following the completion of the second repetition before it has attained sufficient charge to operate relay 120, thereby delaying the operation of relay 110. Then, if during the ten seconds immediately preceding the actual operation of relay 110 a disturbance was noted so that relays 100, 102, 103, and 104 were released, the operation of relay 110 would cause the "number of background tests" register 86 to advance one unit, indicating that one "background test" sample had just been recorded, and would also cause the particular background disturbance registers 84, 83, 82 or 81 to advance one unit, indicating that during this sample interval the disturbance was noted. The "number of background tests" register 86 would, of course, operate in any case when relay 110 operates during the course of a conversation even though none of the background disturbance registers 84, 83, 82 or 81 was operated, thereby indicating that the normal or background disturbance was not appreciable at the time, but nevertheless counting such a sample along with other sample intervals wherein disturbance was noted.

At the conclusion of an observation, the observer operates the time end key 12, as before mentioned, and then proceeds to read the analyzer counters or registers which have been operated and notes these readings on a suitable chart for future study.

As before mentioned neon glow lamps, such as 93 are associated with each pair of registers such as 49 and 61, 48 and 60, 47 and 59, etc. and also with registers 37, 86 and 85. Similar lamps could, of course, be provided for registers 77, 81, 78, 82, 79, 83, 80 and 84, but are not shown in the drawing. As soon as the registers have been read, the associated lamp is extinguished by opening its locking circuit by the operation of the associated key such as 94 associated with lamp 93. Other types of signal lamps may serve as well as the neon glow type shown.

It will be understood that additional keys may be added to the keyboard and assigned for recording and registering other reactions and disturbances in conjunction with the addition of corresponding relays, registers and other obviously necessary apparatus and wiring in the analyzer mechanism.

The usual procedure of interpreting the "foreground" and "background" results, after obtaining records on a plurality of the far-end repetition occurrences and the background samples, is first to obtain the percentage, or proportion, represented in each for the separate disturbances, as for example the per cent of the repetitions preceded in their foreground intervals by "double talking" and the per cent of the background samples in which "double talking" was noted, and similarly for other disturbances. Now in the cases of the more important types of disturbance, which disturbances have at times been of such magnitudes as to have caused some of the requests for the repetitions, the "excess" of each "foreground" disturbance percentage figure over that of the "background" percentage figure for the same type of disturbance is taken to represent the actual percentage of the repetitions which have occurred as a result of the presence of the disturbance. The remaining percentage of far-end repetitions, that is, the portion known to have been preceded by disturbance but not included in the above "excess" group, would normally be assigned to a group known as the "unaccounted for repetitions." From register 85 (no cause) which counts the number of far-end repetitions whose "foreground" intervals were free of notable disturbance, a third percentage figure is obtained and this indicates the percentage of the repetitions which were definitely not associated with any of the disturbances noted. These percentage figures are of interest as they represent indices of the effectiveness of telephone transmission.

As hereinbefore explained the observer (who must be reasonably diligent) records the occurrences of notable disturbances in addition to the occurrences of observed subscriber reactions, with no exercise of mental effort concerning the sequence of occurrences. Thus the above "background" percentage figures represent, by the observer's notations, disturbance conditions in the telephone connection which are apparently satisfactory to the near-end subscriber from the standpoint of repetitions. Included in each background figure, however, there are two factors, namely, a "factor of forbearance" on the part of the subscriber and a "factor of sensitivity" on the part of the observer. As these two factors are components of the "background" figure, they must be present in a like amount (percentage) in the "foreground" figure for each disturbance, representing the cases when the foreground disturbance was apparently of no consequence to the subscriber. It is known that, while the observer's "factor of sensitivity" remains reasonably constant, the subscriber's "factor of forbearance" may vary considerably between his conversations over different telephone connections, depending for example, on the length of the telephone circuit, type of facilities, etc. of which the subscriber may be aware. For instance, the "background" percentage figures for the imperfect radiotelephone connection may be several times greater than those for the same types of disturbance noted by the same observer from observations on wire telephone connections of comparable length. Thus, the "background" percentage figure may be used as an index for general comparison between different types of telephone connections.

It will be understood that, while the "cause and effect" correlation technique and interpretation of the records are explained in terms of the disturbances and far-end repetitions, the same methods could be applied in the cases of disturbances and other tangible reactions.

What is claimed is:

1. In a telephone service observing system for registering observed occurrences and duration of a prechosen type of disturbance which may affect conversation over a line between two subscribers, and also for registering the observed number of times, and the duration, either of the subscribers react in a certain manner, which reaction might be caused by the prechosen type of disturbance, registering equipment including first and second individual registers for accumulatively registering the number of occurrences of the disturbance and the number of subscriber reactions, respectively, manually operated means individual to each register for actuating the respective register, a third accumulative register, and circuit means therefor associated with the disturbance register, means responsive to actuation of the manual means controlling the disturbance register to prepare said circuit means to operate the third register and maintain it prepared for a predetermined interval of time after the manual means is released, and means for closing said circuit means to actuate the third register, responsive to operation of the manual means, controlling the reaction register, during the interval said circuit means is prepared.

2. In a system for selectively registering the occurrence of an observed cause and also the occurrence of an effect for which said cause might be responsible, individual means for accumulatively registering the number of occurrences of said cause and said effect, a separate manually controlled key for operating each accumulative register, a third accumulative register and a circuit therefor, means responsive to the actuation of the key controlling the operation of the cause register to prepare said circuit to operate said third register and hold it prepared for a predetermined interval of time after the cause key is released, and means for completing said circuit responsive to operation of the key controlling the operation of the effect register during the period said circuit is prepared.

3. In a system for observing service on telephone connections, first and second individual means for registering the occurrence of two notable disturbances which occur separately, a third means for registering the simultaneous occurrence of both disturbances wherein the second of said disturbances may be caused by the first, and means for disabling said second means while said first means is operated and for maintaining said disabling for an additional predetermined interval following release of said first means.

4. In a system for registering observed subscriber reactions and disturbances to a telephone connection, a disturbance register, a first manually controlled means for causing operation of said disturbance register to accumulatively register the number of times a predetermined type of disturbance to a conversation is observed, a subscriber's reaction register, a second manually controlled means for causing the operation of said reaction register to accumulatively register the number of times a party to the conversation is observed to react to said disturbances, a background disturbance register, a circuit therefor normally open at two points, delayed operation switching means responsive to operation and subsequent release of said second manual means, for momentarily closing said circuit at one point after the lapse of a predetermined time interval following the release of said second manual means, and other switching means responsive to operation and subsequent release of said first manual means for closing said circuit at a second point for a predetermined time interval shorter than the delay interval of said first delayed operation switching means.

LIONEL SCHOTT.